H. A. Kephart, Imp'd Stream-or-River-Fence.

No. 73,345

PATENTED JAN 14 1868

Witnesses:
A. M. Tanner
Chas. A. Pettit

Inventor:
H. A. Kephart
by Munn & Co
Attorneys

United States Patent Office.

H. A. KEPHART, OF FLETCHER, OHIO.

Letters Patent No. 73,345, dated January 14, 1868.

---

IMPROVEMENT IN STREAM OR RIVER-FENCES.

---

The Schedule referred to in these Letters Patent and making part of the same.

---

TO ALL WHOM IT MAY CONCERN:

Be it known that I, H. A. KEPHART, of Fletcher, in the county of Miami, and State of Ohio, have invented a new and improved Stream or River-Fence; and I do hereby declare that the following is a full and exact description thereof, which will enable others skilled in the art to make and use the same, reference being had to the accompanying drawings, and to the letters of reference marked thereon.

This invention relates to a new and improved fence, of that class designed to be placed across rivers and streams.

The invention consists in a novel construction and arrangement of parts, whereby due provision is made against the passage of earth or animals around the ends of the fence when the stream or river is low. In the accompanying sheet of drawings—

Figure 1:
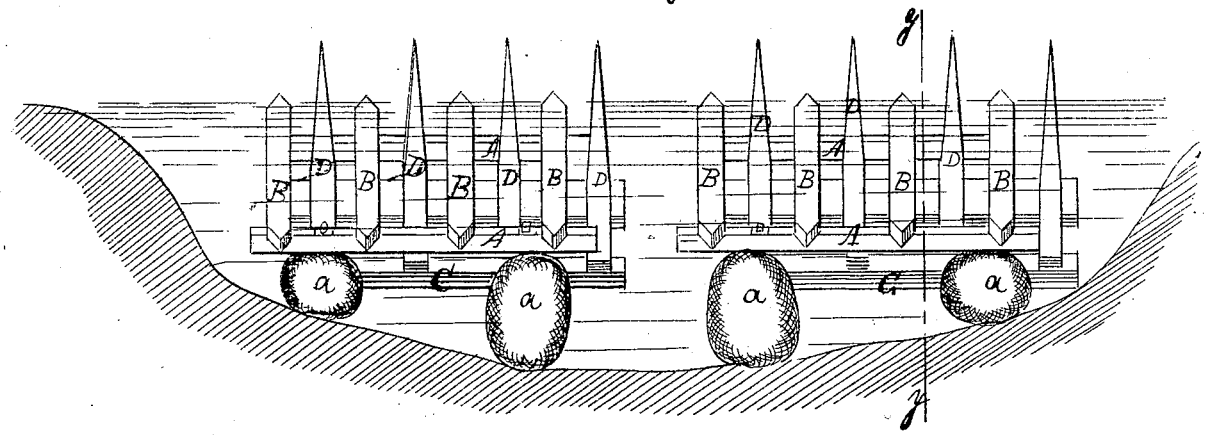

Figure 1 is a side view of my improved fence, put up or erected across a river or stream.

Figure 2:
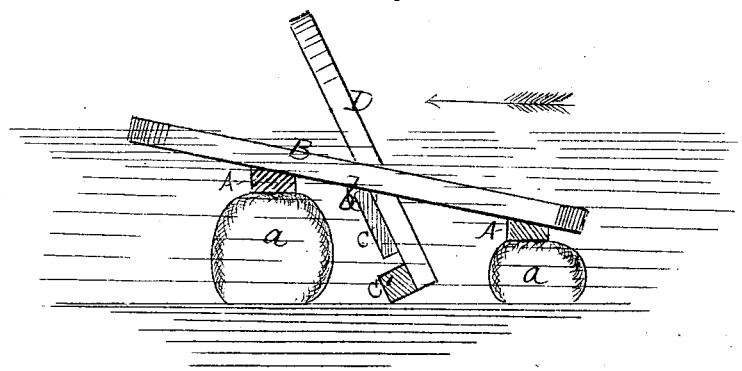

Figure 2, a transverse vertical section of the same, taken in the line $y\ y$, fig. 1.

Similar letters of reference indicate like parts.

This fence is composed of wooden sill-pieces A, secured to rocks $a$ or other fixtures, such as piles or posts. In most cases it would be preferable to secure the sill-pieces to rocks, by means of bolts or staples, fitted in holes drilled in the rocks. These sill-pieces are placed at any suitable distance apart, and have slats B nailed or otherwise secured to them, the sill-pieces being placed, one a trifle higher than the other, so that the slats will have a somewhat inclined position longitudinally with the river or stream, the most elevated ends of the slats being "down stream." The rocks $a$, or other supports for the sill-pieces, are sufficiently high to have the slats B, at their lower or depressed ends, at least a foot from the bed or bottom of the river or stream. To the under sides of the slats B there is suspended by staples or other suitable joints, $b$, a wooden beam, C, to which slats D are nailed or otherwise secured. These slats, D, extend upward between the slats, B, of the sill-pieces A, and the beam C serves as a counterpoise. Another beam, C', may be attached to the lower ends of the slats D, for the same purpose.

These beams serve to keep the slats D elevated; still, they are not designed to prevent said slats from yielding or giving, to admit of drift-wood freely passing them. The slats B serve as a barrier to the passage of cattle or horses, even when the bed of the river or stream on which their sill-pieces rest is perfectly dry, and the slats B, in connection with the slats D, which are fully elevated when the stream or river is low, render the passage of cattle or other animals over them utterly impossible.

Having thus described my invention, I claim as new, and desire to secure by Letters Patent—

The sill-pieces A A, secured in position, as shown, or in any equivalent way, and having the slats B attached, in connection with the counterpoised slats D, arranged substantially in the manner as and for the purpose specified.

The above specification of my invention signed by me, this eighth day of August, 1867.

H. A. KEPHART.

Witnesses:
S. C. JONES,
WM. H. BISHOP.